United States Patent [19]

Matsui et al.

[11] Patent Number: 4,575,118
[45] Date of Patent: Mar. 11, 1986

[54] SUPPORT CONSTRUCTION OF SECURING MEMBER FOR SECURING AN OCCUPANT RESTRAINING WEBBING

[75] Inventors: Kenji Matsui; Hironori Sasaki, both of Aichi, Japan

[73] Assignee: Kabushiki Kaisha Toka-rika-denki-seisakusho, Aichi, Japan

[21] Appl. No.: 584,901

[22] Filed: Feb. 29, 1984

[30] Foreign Application Priority Data

Mar. 4, 1983 [JP] Japan .................. 58-31475[U]

[51] Int. Cl.[4] .................. A62B 35/00; A47C 31/00
[52] U.S. Cl. .................. 280/801; 297/468
[58] Field of Search .............. 297/464, 468, 471, 483; 280/801, 804, 808; 24/163 R, 305

[56] References Cited

U.S. PATENT DOCUMENTS 4,253,702 3/1981 Lehr .................. 280/801

FOREIGN PATENT DOCUMENTS 2365250 7/1975 Fed. Rep. of Germany ...... 280/801

Primary Examiner—Richard A. Bertsch
Attorney, Agent, or Firm—Thomas W. Cole

[57] ABSTRACT

In a support construction of securing member for securing an occupant restraining webbing applied to a vehicle and adapted for supporting the securing member to a vehicle body through an extension member, an intermediate portion of the extension member is connected to the securing member through connecting means, therewith a forward end portion of the extension member formed in a portal shape is received in a support hole formed on the securing member, and the back portion of the portal shape portion is caused to abut on a peripheral portion of the support hole and a pair of receiving portions are formed on both sides of the portal shape portion.

Accordingly, the receiving portions are latched to a peripheral portion of the support hole and a large tension load acting between the securing member and the extension member can surely be sustained in an emergency situation of the vehicle.

17 Claims, 4 Drawing Figures

SUPPORT CONSTRUCTION OF SECURING MEMBER FOR SECURING AN OCCUPANT RESTRAINING WEBBING

BACKGROUND OF THE INVENTION

1. Field of the Invention

The present invention relates to a support construction of a securing member for securing an occupant restraining webbing adapted for use in a seatbelt system for protecting an occupant in an emergency situation of a vehicle and supporting the securing member to a vehicle body.

2. Description of the Prior Art

In the seatbelt system, the occupant restraining webbing is supported to the body of the vehicle through a buckle device, as being the securing member. The buckle device is disposed at a side portion of the waist of an occupant sitting on a seat of the vehicle through an extension plate as being an extension member projectingly mounted on the body of the vehicle.

The extension plate and the buckle device are fixed to each other by such connecting member as a rivet penetrating a forward end portion of the former and a plate portion of the buckle device, whereby a tension load acting on the buckle device in the emergency situation of the vehicle is transmitted to the extension plate through the rivets.

However, the rivets must be subjected to calking work at a time of assembly of the extension plate and the buckle device, which requires that the rivets are made of mild material such as a mild steel. Accordingly, the rivets having a large diameter must be used in order to sustain the webbing tension surely in the emergency situation of the vehicle.

SUMMARY OF THE INVENTION

In view of the above problems, the present invention has as its object the provision of a support structure of a securing member for securing an occupant restraining webbing capable of securing the securing member surely to the extension member without enlargement of a diameter of such connecting means as a rivet or a pin connecting the securing member, for example a buckle device, and the extension member.

In the support construction according to the present invention, an intermediate portion of the extension member is connected to the securing member through the connecting means, therewith a portal shape portion formed on a forward end portion of the extension member is received in a support hole formed on the securing member, the back portion of the portal shape portion is caused to abut against a peripheral portion of the support hole and a pair of receiving portions are formed on both side portions of the portal shape portion, whereby the receiving portions are latched to a periphery of the support hole and a large tension load acting between the securing member and the extension member can surely be sustained in an emergency situation of the vehicle.

PREFERRED EMBODIMENT OF THE INVENTION

Figure 1:
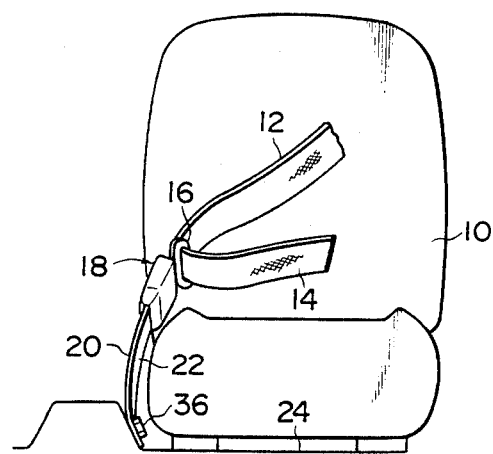
FIG. 1 is a front view from a front portion of a vehicle in which a support construction according to the present invention is applied to a seatbelt system.

FIG. 1 shows a seatbelt system to which a support construction of a securing member for securing an occupant restraining webbing according to the present invention is applied. The seatbelt system is such designed that an occupant sitting on a seat 10 is put in a fastened situation of the seatbelt system of a three points type by a shoulder webbing 12 and a lap webbing 14.

One ends (not shown) of the shoulder and lap webbings 12 and 14 are respectively secured to a side wall of a vehicle body, the other ends thereof are connected to each other, and a tongue plate 16 is secured to the connection portion of the shoulder and lap webbings 12 and 14. The tongue plate 16 can be locked to a buckle device 18, as being the securing member, and the buckle device 18 is projectingly mounted on a floor 24 of the vehicle through extension plates 20 and 22, as being an extension member, so that the buckle device 18 is positioned in a neighborhood of the waist of the occupant sitting on the seat 10.

A fixing construction of the buckle device 18 and the extension plates 20 and 22 is explained below with reference to FIGS. 2 to 4.

Extended from a buckle body 18A of the buckle device 18 is an elongated plate 26 on which a rectangular support hole 28 is formed.

One end portion 28A of a longitudinal direction of the rectangular support hole 28 is positioned in a neighborhood of the buckle body 18A and the other end portion 28B thereof is positioned in the side of the floor 24 of the vehicle. Formed at both the side portions of intermediate portion of longitudinal direction of the support hole 28 through step portions 30 and 31 are wide width portions 32. Also, the elongated plate 26 is provided with a pair of circular holes 34 in the neighborhood of the other end portion 28B of the support hole 28.

On the other hand, the extension plates 20 and 22 have similar configuration to each other and are made of leaf spring material. The extension plates 20 and 22 are piled to each other and one ends (shown in FIG. 1) thereof are fixed to the floor 24 of the vehicle body through an anchor bolt 36.

Formed at intermediate portions in the vicinity of the forward end portions of the extension plates 20 and 22 are a pair of circular holes 38 for inserting rivets 40, as being connecting means, therein.

Also, formed at both the side portions of the extension plates 20 and 22 in the vicinity of the forward end portions thereof are cutouts 42, and the extension plates 20 and 22 have bent portions 43 in the vicinity of the cutouts 42 so that the forward end portions of the extension plates 20 and 22 are bent. The extension plates 20 and 22 are formed at both the sides of the forward end portions with leg portions 44 bent at substantially right angles and in same directions to each other. That is to say, the forward end portions of the extension plates 20 and 22 have portal, or channel, configurations. Formed at the side of each of the cutouts 42 in each of the leg portions 44 in a direction of the circular hole 38 is a hook portion 46, as being a receiving portion.

Figure 4:
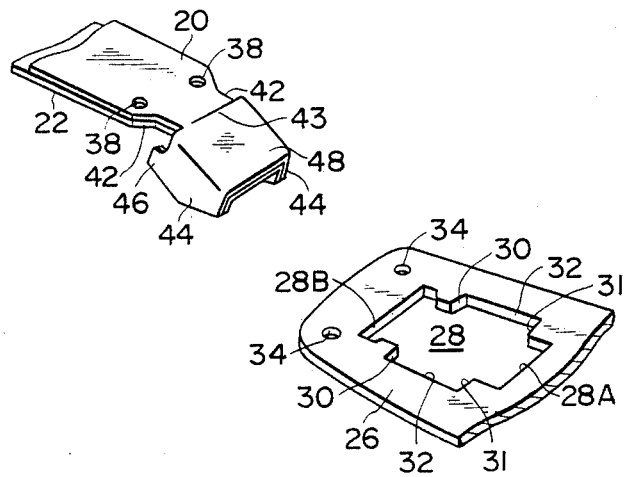
FIG. 4 is a disassembled perspective view showing a plate number extending from the buckle device and forward end portions of the extension plates.

In this connection, the extension plate 20 is disposed on the extension plate 22 and the back 48 of the portal shape portion is exposed, as shown in FIG. 4.

The embodiment thus constructed is described below as to assembly thereof.

The extension plates 20 and 22 are inserted from the forward end portions into the support hole 28, especially the wide width portions 32 and, thereafter, they are pulled out in a slight amount, whereby the hook portions 46 of the leg portions 44 are latched to the step portions 30 of the support hole 28, so that they are caused to abut on the back portion of the elongated plate 26. In addition, the back 48 of the portal shape portion of the extension plate 20 is also caused to abut on the step portions 31 of the support hole 28.

In these situations, the rivets 40 are inserted in the circular holes 34 and 38 and they are subjected to calking work, whereby the extension plates 20 and 22 are fixed to the elongated plate 26.

Figure 2:
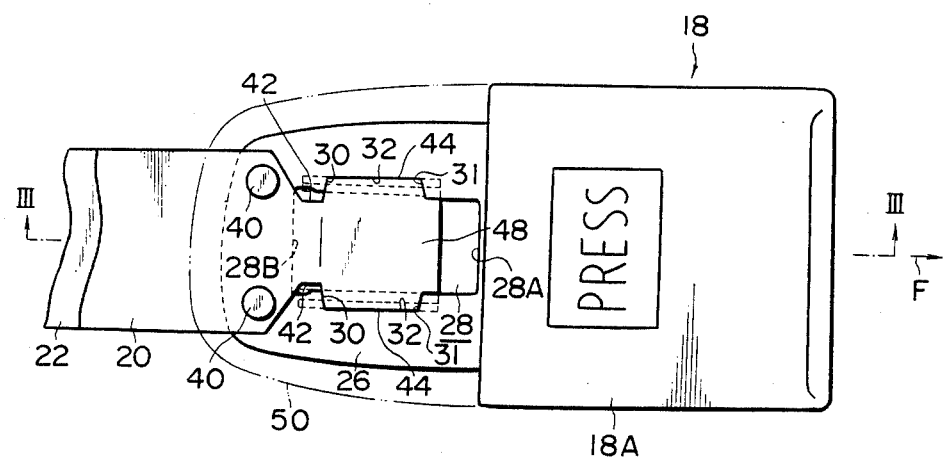
FIG. 2 is a plan view showing a situation in which a buckle device and extension plates are connected to each other.

In this connection, it is preferable that the connected portion of the extension plates 20 and 22 and the elongated plate 26 is covered with a protection cover 50 shown in FIG. 2 with a double dotted line.

In the embodiment thus constructed, one ends of the extension plates 20 and 22 are fixed to the floor 24 of the vehicle body through the anchor bolt 36, shown in FIG. 1, so that the buckle device 18 is projectingly mounted at one side of the seat 10. Accordingly, an occupant sitting on the seat 10 can easily lock the tongue plate 16 to the buckle device 18, so that he can be put in the fastened situation of the seatbelt system of the three points type.

In an emergency situation of the vehicle the occupant is thrown out, for example in a direction of a collision, whereby a large tension load acts upon the webbings 12 and 14. The tension load occurs in such a direction as to separate the buckle device 18 from the extension plates 20 and 22, i.e., in a direction of arrow F shown in FIGS. 2 and 3. When the tension load becomes large, the rivets 40 are destroyed, or broken, but the buckle device 18 can surely be supported to the vehicle body since the portal shape portions of the extension plates 20 and 22 are latched to the elongated plate 26.

Figure 3:
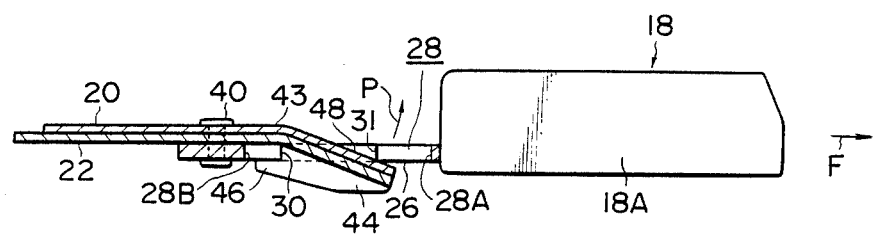
FIG. 3 is a sectional view taken along line III—III shown in FIG. 2.

Particularly speaking, the portal shape portion is subjected to a force acting in such a direction that the bent portion 43 is caused to disappear, that is, in a direction of arrow P shown in FIG. 3, by the tension load acting in the direction of arrow F, but the extension plates 20 and 22 can securely sustain the force acting in the direction of arrow P since the back 48 of the portal shape portion is caused to abut on the step portions 31. In addition thereto, since the hook portions 46 of the portal shape portion are latched to the step portions 30, the buckle device 18 is prevented from being pulled out of the extension plates 20 and 22.

In the embodiment described above, the extension member has a structure of two sheets of extension plates piled but the number of the extension plate can be changed, if necessary. In the above embodiment, also, the receiving portions are formed in the hook shape on the extension plates 20 and 22 for sustaining the tension load acting between the buckle device 18 and the extension plates 20 and 22. However, the receiving portions are not limited to the hook shape but they may have such a structure as to be capable of sustaining the tension load surely.

What is claimed is:

1. A support construction of a securing member for securing an occupant restraining webbing, applied to a vehicle and adapted for supporting the securing member to a vehicle body through an extension member, which comprises:
   (a) the securing member formed with a rectangular support hole wherein said hole is formed with step portions which are oriented along the width of the securing member at an intermediate portion within the rectangular support hole;
   (b) the extension member, a forward end portion thereof being bent at both its side portions to be formed in a portal shape, the portal shape portion being received in the rectangular support hole and the back of the portal shape portion being caused to abut on a periphery of the rectangular support hole, and the portal shape portion being formed at both the side portions with hook-shaped receiving portions, each of which includes a forward end which is positioned at the back of the securing member, whereby the step portions of the rectangular support hole are latched to the hook-shaped receiving portions in an emergency situation of the vehicle and a tension load acting between the securing member and the extension member is sustained, and
   (c) a connecting means connecting the securing member and the extension member.

2. A support construction as set forth in claim 1, wherein the support member comprises two sheets of extension plates piled to each other.

3. A support construction as set forth in claim 1, wherein the support hole is formed on an elongated plate extending from the securing member.

4. A support construction as set forth in claim 1, wherein the extension member is formed at both side portions thereof with cutouts and the portal shape portion is formed from the cutouts towards a forward end of the extension member.

5. A support construction as set forth in claim 4, wherein the support hole is formed on an elongated plate extending from the securing member, and the extension member is disposed in substantially same direction as the elongated plate and the extension member is bent in the vicinity of the cut-outs, so that the back of the extension member abuts on the periphery of the support hole.

6. In a support construction of a securing member for securing an occupant restraining webbing, applied to a vehicle and adapted for supporting the securing member to a vehicle body through an extension member, the improvement wherein the extension member is connected at its intermediate portion to the securing member through connecting means, and therewith both side portions of the extension member are bent at its forward end portion so that the forward end portion is formed in a portal shape, the portal shape portion is received in a support hole formed on the securing member, and back of the portal shape portion is caused to abut on the periphery of the support hole and a pair of receiving portions are formed on both the side portions of the portal shape portion, whereby the receiving portions are latched to the periphery of the support hole and a tension load acting between the extension member and the securing member can be sustained in an emergency situation of the vehicle.

7. A support construction as set forth in claim 6, wherein the support hole is of a rectangular shape.

8. A support construction as set forth in claim 7, wherein the support hole is formed with step portions in directions of width of the securing member to be provided at an intermediate portion thereof with a wide width portion, and the receiving portions are latched to the step portions.

9. A support construction as set forth in claim 8, wherein the receiving portions are formed in hook shape and forward ends of the hook shape portions are positioned at the back of the securing member.

10. A support construction as set forth in claim 9, whererin the support member comprises two sheets of extension plates piled to each other.

11. A support construction as set forth in claim 10, wherein the support hole is formed on an elongated plate extending from the securing member.

12. A support construction as set forth in claim 11, wherein the extension member is formed at both side portions thereof with cutouts and the portal shape portion is formed from the cutouts to a forward end of the extension member.

13. A support construction as set forth in claim 12 wherein the extension member is disposed in the substantially same direction as the elongated plate and the extension member is bent in the vicinity of the cutouts, so that the back of the extension member is caused to abut on the periphery of the support hole.

14. A support construction of a securing member for securing an occupant restraining webbing, applied to a vehicle and adapted for supporting the securing member to a vehicle body through an extension member, which comprises:

(a) the securing member, thereto a tongue plate fixed to the occupant restraining webbing being inserted and locked;

(b) an elongated plate extending from the securing member and formed with a support hole;

(c) the extension member, one end portion thereof being fixed to the vehicle body and the other end portion being bent at both side portions to be formed in a portal shape, the portal shape portion being received in the support hole, so that a back of the portal shape portion is caused to abut on the periphery of the support hole and a pair of receiving portions are formed on both the side portions of the portal shape portion, whereby the receiving portions are latched to the support hole and a tension load acting between the extension member and the elongated plate can be sustained in an emergency situation of the vehicle; and (d) connecting means connecting the extension member and the elongated plate through through-holes formed on them.

15. A support construction as set forth in claim 14, wherein the support hole is of a rectangular shape and is formed with step portions in directions of width of the securing member to be provided at an intermediate portion thereof with a wide width portion, whereby the receiving portions are latched to the step portions in the emergency situation of the vehicle.

16. A support construction as set forth in claim 15, wherein the receiving portions are formed in hook shape and forward ends of the hook shape portions are positioned at the back of the securing member.

17. A support construction as set forth in claim 16, wherein the extension member is disposed in the substantially same direction as the elongated plate and the extension member is bent in the vicinity of the portal shape portion, so that the back of the extension member is caused to abut on the periphery of the support hole.

* * * * *